US012514708B2

United States Patent
Link et al.

(10) Patent No.: US 12,514,708 B2
(45) Date of Patent: Jan. 6, 2026

(54) MODULAR PROSTHESIS FOR AT LEAST PARTIAL REPLACEMENT OF A TUBULAR BONE ADJOINING A JOINT

(71) Applicant: WALDEMAR LINK GMBH & CO. KG, Hamburg (DE)

(72) Inventors: Helmut D. Link, Hamburg (DE); Sebastian Spath, Hamburg (DE)

(73) Assignee: WALDERMAR LINK GMBH & CO. KG, Hamburg (DE)

( * ) Notice: Subject to any disclaimer, the term of this patent is extended or adjusted under 35 U.S.C. 154(b) by 761 days.

(21) Appl. No.: 17/753,877

(22) PCT Filed: Sep. 16, 2020

(86) PCT No.: PCT/EP2020/075845
§ 371 (c)(1),
(2) Date: Mar. 16, 2022

(87) PCT Pub. No.: WO2021/053004
PCT Pub. Date: Mar. 25, 2021

(65) Prior Publication Data
US 2022/0401219 A1    Dec. 22, 2022

(30) Foreign Application Priority Data
Sep. 18, 2019   (EP) .................................. 19198089

(51) Int. Cl.
*A61F 2/30*   (2006.01)
*A61F 2/36*   (2006.01)
(Continued)

(52) U.S. Cl.
CPC ...... *A61F 2/30734* (2013.01); *A61F 2/30767* (2013.01); *A61F 2/3607* (2013.01);
(Continued)

(58) Field of Classification Search
CPC ...... A61F 2/3609; A61F 2/367; A61F 2/3607; A61F 2/3672; A61F 2002/3611;
(Continued)

(56) References Cited

U.S. PATENT DOCUMENTS

| 4,834,758 A | 5/1989 | Lane et al. |
| 2007/0129809 A1* | 6/2007 | Meridew ............. A61F 2/30728 623/22.32 |

(Continued)

FOREIGN PATENT DOCUMENTS

DE   202004019264 U1   4/2006

OTHER PUBLICATIONS

International Search Report and Written Opinion mailed Dec. 8, 2020, in connection with International Patent Application No. PCT/EP2020/075845, filed Sep. 16, 2020, 14 pgs. (Including translation).

(Continued)

*Primary Examiner* — Javier G Blanco
(74) *Attorney, Agent, or Firm* — Chiesa Shahinian & Giantomasi PC

(57) ABSTRACT

Modular endoprosthesis for at least partial replacement of a tubular bone, including, as module components, a stem for insertion into a bone cavity of the tubular bone, and an end piece including a support body with a neck part arranged on the medial aspect thereof. The module components being able to be coupled to each other and released from each other along a longitudinal axis of the shaft. The end piece has at least two different surface configurations on its support body, namely a closed surface (6') on a medial aspect, and a porous configuration of the surface on the opposite, lateral aspect. The latter permits and positions the adhesion of muscle tissue, specifically without suturing. The muscle trauma caused by suturing, and the peak loads that occur at (Continued)

the respective suture points, can thus be avoided by virtue of the invention.

18 Claims, 2 Drawing Sheets

(51) Int. Cl.
  *A61L 27/28* (2006.01)
  *A61L 27/56* (2006.01)
(52) U.S. Cl.
  CPC ............ *A61F 2/3672* (2013.01); *A61L 27/28* (2013.01); *A61L 27/56* (2013.01); *A61F 2002/30604* (2013.01)
(58) Field of Classification Search
  CPC .......... A61F 2/30739; A61F 2002/3092; A61F 2002/3093; A61F 2002/30985; A61F 2250/0024; A61F 2/30734; A61F 2002/30736
  See application file for complete search history.

(56) References Cited

U.S. PATENT DOCUMENTS

| | | |
|---|---|---|
| 2008/0281428 A1 | 11/2008 | Meyers et al. |
| 2011/0009973 A1 | 1/2011 | Meyers et al. |
| 2012/0035733 A1 | 2/2012 | Porter et al. |
| 2014/0172115 A1 | 6/2014 | Porter et al. |
| 2016/0296336 A1 | 10/2016 | Maale |
| 2018/0193152 A1 | 7/2018 | Bauer |

OTHER PUBLICATIONS

Stryker, "GMRS Proximal Femoral Surgical Protocol," 2011. retrieved from the internet: http://az621074.vo.msecnd.heUsyk-mobile-content-c dn/global-content-system/SYKGCSDOC-2-39102/ LpfVxU6 BH5zQaSHYHR5sVtY_wEnvAQ/LSPK41.pdf, pp. 1-32.

* cited by examiner

MODULAR PROSTHESIS FOR AT LEAST PARTIAL REPLACEMENT OF A TUBULAR BONE ADJOINING A JOINT

CROSS-REFERENCE TO RELATED APPLICATIONS

This application is a national stage of International Patent Application Serial No. PCT/EP2020/075845, filed Sep. 16, 2020, which claims priority to European Patent Application No. 19198089.5, filed Sep. 18, 2019, the disclosures of both are incorporated herein by reference in their entirety.

FIELD

The invention relates to a modular endoprosthesis for at least partial replacement of a long bone, comprising as module components a stem for insertion into a bone cavity of the long bone, and an end piece comprising a supporting body and a neck part, the latter having a receptacle for a joint device and being arranged on the medial side.

BACKGROUND

Various types of endoprostheses are known for replacing diseased or defective bones and joints. In particular, these include pure joint endoprostheses, and also others that partially or completely replace the adjacent long bones. They have a stem that extends over the length of the long bone to be replaced. The stem replaces or reinforces the diseased or missing area of bone. It is often connected to a joint unit that replaces an adjacent joint (for example, a knee or hip). The dimensions of the prosthesis socket must therefore be chosen according to the given anatomy and pathology of the patient.

Modular endoprosthesis systems for the purpose of adapting to individual needs are known. They include a stem, optionally several intermediate pieces, and an end piece, which usually also forms a joint component. Such a system is known, for example, from DE 20 2004 019 264 U1. Also known from prior use is a modular system from DePuy, Inc. (USA) called the Orthopedic Salvage System, in which the end piece has a porous coating all around it.

It has been shown that satisfactory growth behavior can be achieved with the system on portions of bone that are still present. With regard to the connection to soft tissues, such as muscles in particular, there is a need for improvement. Experiments with a coating containing tantalum have shown that it can only stimulate the adhesion of connective tissue, but not the muscle attachment that is actually desired.

The invention is based on the object of creating a modular endoprosthesis of the type mentioned at the outset which exhibits better behavior with regard to muscle adhesion.

The solution according to the invention lies in the features of the independent claim. Advantageous refinements are the subject matter of the dependent claims.

In a modular endoprosthesis for the at least partial replacement of a long bone, comprising as module components a stem for insertion into a bone cavity of the long bone, and an end piece comprising a supporting body with an anterior, posterior, lateral and medial side and comprising a neck part which is arranged on the medial side and which has a receptacle for a joint device, and at least one intermediate piece, wherein the module components can be coupled to and detached from each other along a longitudinal axis of the stem, for example via plug-in connections or other types of connection, according to the invention, the end piece has at least two differently designed surface formations on its supporting body—a closed surface on a medial side facing the neck part, and a porous formation of the surface on the lateral side facing away from the neck part.

The terms lateral, medial, anterior and posterior are common anatomical terms for directions. In this case, "lateral" means towards the outside, "medial" means towards the center (of the body), anterior means towards the front, and posterior means towards the back.

The invention is based on the idea of making the surface porous, which is favorable for the adhesion of muscle tissue, in a targeted manner at a specific point—and specifically only at that point and not all around. This particular location is the lateral side, that is, the side that faces laterally outward when implanted. On the one hand, the porous formation creates a basis for the reliable adhesion of soft tissue, including muscle tissue, and on the other hand, the precise positioning of the porous formation and its concentration at the specific point (and only there, i.e., not all around) achieves a favorable adhesion behavior of the muscle in a targeted and specific manner. The muscle should attach at this specific point resulting in a favorable power transmission to the prosthesis (and thus to the corresponding extremity). In the case of an endoprosthesis for the proximal femur, the muscle that is offered a location-specific adhesion point according to the invention is the so-called "gluteus medius."

The invention has recognized that with such a design, a location-specific growth of the muscle can be achieved in such a way that the muscle is directly attached. The suturing that is conventionally required to connect the muscle to the end piece of the endoprosthesis is therefore no longer necessary. The direct attachment is capable of greater force transmission and is more robust, particularly compared to the muscle suturing technique commonly used in the prior art. This is because this suturing basically damages the muscle and leads to a concentration of stress in the area of the sutures, which can lead to unfavorable load peaks and thus to a negative prognosis for the reliability of the attachment. The design for direct connection avoids these disadvantages. The traumatization of the muscle caused by the suturing and the peak loads occurring at each of the suture points can thus be avoided by virtue of the invention with the location-specific direct attachment of the muscle. A faster and more reliable mobilization of the patient can be achieved with a reduced risk of complications.

It is expediently provided that the porous formation of the surface is designed as an open-cell porous lattice structure which is formed from a plurality of unit cells which are typically arranged in a regular manner; however, an irregular arrangement of the unit cells is also useful. Such an open-cell structure promotes rapid ingrowth of the muscle tissue, even into deeper-lying pores, resulting in a higher load-bearing capacity of the muscle/endoprosthesis connection as a further advantage. In addition, the power transmission between the muscle and the endoprosthesis is consequently improved. In this case, the unit cells are advantageously designed as an assembled structure, and are each made up of an interior space and a plurality of bars which are interconnected and which surround the interior space. For example, such an assembled structure can be efficiently manufactured using additive processes, such as 3D printing. In this way, components with complex cavity structures with an undercut can be manufactured quickly and efficiently in a controlled manner. The structure of the unit cells can be precisely defined in this case. This enables a defined arrangement of the cells and the elements forming them. In particular, these methods are suitable for producing the implant from biocompatible material, known in the art, examples of which are pure titanium, titanium alloys, cobalt-chrome, tantalum, stainless steel and zirconium.

The porous lattice structure is advantageously provided with a coating which promotes growth. Such coatings, known in the art, accelerates the growth of soft tissue into and onto muscle material and its tendons. Particularly useful coatings are made of calcium phosphate, and tantalum material are particularly preferred.

The porous formation expediently has pores with a width in the range between 0.4 and 2 mm, preferably 0.7 to 1.5 mm. These relatively large pores offer better ingrowth behavior and, above all, anchoring potential for muscle tissue.

It is expedient to design the supporting body and the porous formation and/or the open-cell porous lattice structure as a unit. In this way, an otherwise necessary assembly of separate components can be avoided, which results in advantages in terms of robustness, simpler and direct production, and durability. In particular, there is no reason to expect a failure of a joined connection, or negative effects of the joined connection on the surrounding tissue. This applies in particular with regard to the fact that, in the case of a unitary design, the entire supporting body, including the porous formation, consists of completely identical material.

It is particularly preferred if the porous formation extends from the lateral side in the manner of a half shell to the frontal side and to the posterior side. The porous formation thus extends over a considerable area of the circumference of the supporting body carrying the neck part, but without being completely circumferential. This creates a broader, but still precisely defined, adhesion surface for adjacent soft tissue, in particular muscles. The notion of "in the manner of a half shell" is to be understood qualitatively; it does not necessarily have to mean a circumferential angle of 180°. In many cases, it can also be less (or a little more). A range for the circumferential angle of the coating of approximately 120° to 210° is preferred. It is important for the qualification as a half shell that the porous formation extends from the lateral side surface both to the front and to the back (posterior), but without also extending over the significant portions of the medial area (which would then be circumferential, which is not permitted).

Particularly if there is a contour in the manner of a half shell, but also in other cases, a rounding with a lateral flattening is expediently provided at the transition between the lateral side and the frontal side and/or the posterior side. With such a flattening on the lateral side, a broader and relatively flat contact and growth surface for the surrounding soft tissue, in particular muscles, can be created. This favors adhesion over a larger area, which enables better and more robust power transmission from the muscle to the prosthesis. It is particularly preferred if the lateral flattening is flat or has a minimum radius of curvature of twice the distance from the anterior to the posterior side of the supporting body. The subsequent rounding ensures a harmonious, stepless and edge-free transition to the anterior and/or posterior, which avoids the risk of detachment of the attached soft tissue, especially muscle, in this region. It is particularly expedient in this case if the rounding has a radius of curvature that is at most a quarter of the distance from the frontal to the posterior side of the supporting body.

In terms of a more comprehensive integration into the surrounding soft tissue, it is also advantageous if the porous formation extends to an upper side of the supporting body, but in a lateral region. With the extension to the upper side, a physiologically and anatomically favorable adhesion opportunity for the muscle, in particular the gluteus medius, is created. In this way, the adhesion surface for the surrounding soft tissue, in particular muscle, is focused on this upper region. As already mentioned, this is physiologically and anatomically favorable, and this advantage can thus be used for more efficient integration of the prosthesis according to the invention into the surrounding soft tissue, in particular muscle. Alternatively or additionally, it is expedient if a lower region of the end piece, in particular of its supporting body, remains uncovered by the porous formation. Adhesion of soft tissue in this region can be prevented or reduced in this way, which prevents the adhesion of undesired connective tissue.

However, it should not be ruled out that a plurality of passage holes arranged parallel next to each other is additionally provided in the lateral region, these passage holes extending from the frontal to the posterior side of the supporting body. This means that traditional fastening techniques can be used to further increase the reliability of attachment. It is expedient in this case if the passage holes open out in the region having the porous formation, and each of their openings is provided with a closed border which in turn is preferably completely surrounded by the porous formation. This results in a uniform place for load application, specifically in the region of the porous formation with respect to the passage holes. As such, everything remains concentrated in one area with comparable force conditions.

The supporting body is advantageously tapered at its lower end, and the porous formation extends up to the tapered region. In other words, this means that the porous formation ends in the region of the transition to the taper. The place of adhesion is thus limited to the upper region of the supporting body, which provides an advantage in terms of biomechanics and leverage.

In a particular embodiment, the endoprosthesis according to the invention is designed in such a way that it belongs to a prosthesis system which comprises modular components, in particular exchangeable intermediate pieces or exchangeable end pieces. In this case, the modular components can be connected by means of matching connections, like plug-in connections and anti-rotation locks. This enables the endoprosthesis according to the invention to be integrated into already existing prosthesis systems, whereby the advantages of the known prosthesis system are combined with the advantageous effects of the invention.

BRIEF DESCRIPTION OF THE DRAWINGS

The invention is explained in more detail below with reference to the attached drawing by way of example, using an embodiment, wherein.

DETAILED DESCRIPTION

Figure 1:
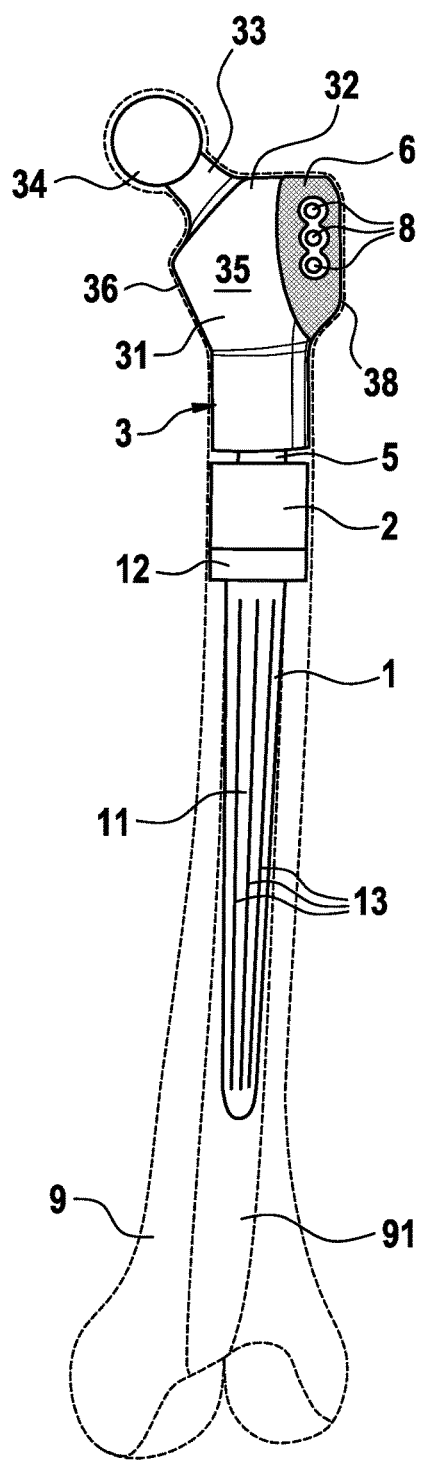
FIG. 1 is a view of a modular femoral prosthesis for a femoral component of a proximal hip joint endoprosthesis, with an end piece, according to an embodiment.

A modular endoprosthesis according to the embodiment shown in the figures is designed as a modular femoral component of a hip joint endoprosthesis for implantation on a femur 9. It comprises a stem part 1, an intermediate piece 2 and an end piece 3 as essential components. In this particular embodiment, the individual components 1, 2, 3 are connected to each other in a rotationally fixed manner, for example via plug-in connections 5.

The stem part 1 comprises an anchoring region 11 tapering conically in the lower portion, with several anchoring ribs 13 running in the longitudinal direction of the stem part 1. The anchoring region 11 is designed to be implanted in a bone cavity (intramedullary canal) 91 of the femur 9.

In its upper region, the stem part 1 also includes a coupling part 12 with a larger cross section. It has a cylindrical shell surface and is connected to the intermediate piece 2 via a conical plug-in connection (not visible in FIG. 1) by means of a male part and a female part arranged on the adjacent intermediate piece 2. The intermediate piece 2 in turn is correspondingly connected to the end piece 3 via a further conical plug-in connection 5.

The end piece 3 is divided into two regions: on the one hand, it comprises as its main component a supporting body 31 with a female cone as part of the plug-in connection 5 to the intermediate piece 2, and comprises a neck part 32 which comprises a retaining pin 33 shaped as a truncated cone for receiving a joint ball 34 as part a joint device of an artificial hip joint, the joint ball 34 being pivotably mounted in a socket of an acetabular component (not shown) of the artificial hip joint when in the implanted state. The retaining pin 33 of the neck part 32 is arranged on a medial side 36 of the end piece 3, and the lateral side 38 of the end piece 3 is situated opposite therefrom; the two are connected via an anterior side 35 and a rear (posterior) side 37. The distance between the anterior side 35 and the posterior side 37 determines the thickness d of the supporting body 31. On the other hand, the end piece 3 has, as a further main component, a porous formation 6 of its surface, which is provided in an upper region of the supporting body 31 on the lateral side, and only there. This will be explained in more detail later.

Figure 2:
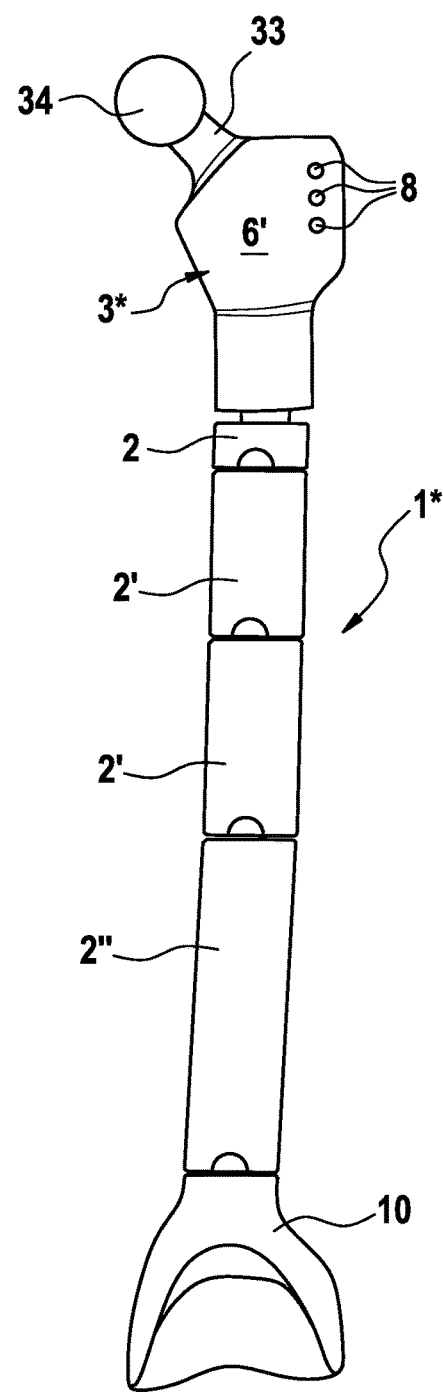
FIG. 2 is a view of a total femoral prosthesis.

Further components of the modular endoprosthesis are shown in FIG. 2. The end piece 3* can be seen, which corresponds to the end piece 3, but, in contrast to the latter, does not have a porous formation 6 on the lateral side. Rather, it has a differently formed surface 6' all around, which specifically is closed and smooth. The intermediate piece 2 is in turn inserted into this end piece 3*. In contrast to the embodiment shown in FIG. 1, however, the stem part 1* is not intended for anchoring in the intramedullary canal 91 of the femur 9, but instead completely replaces the natural femur 9, specifically with a long stem part which is composed of several intermediate pieces 2' and 2". At the opposite, lower end of the stem part 1*, a condyle piece 10 is arranged as the lower end piece. This replicates the form and function of the condyles of the natural knee joint, and thus forms the femoral part of an artificial knee joint. It goes without saying that the modular components, as shown in FIGS. 1 and 2, can be combined with each other or exchanged as desired. In this way it is possible to adapt the modular endoprosthesis to the given anatomical conditions and to the bone and/or joint defects of the patient.

Figure 3A:
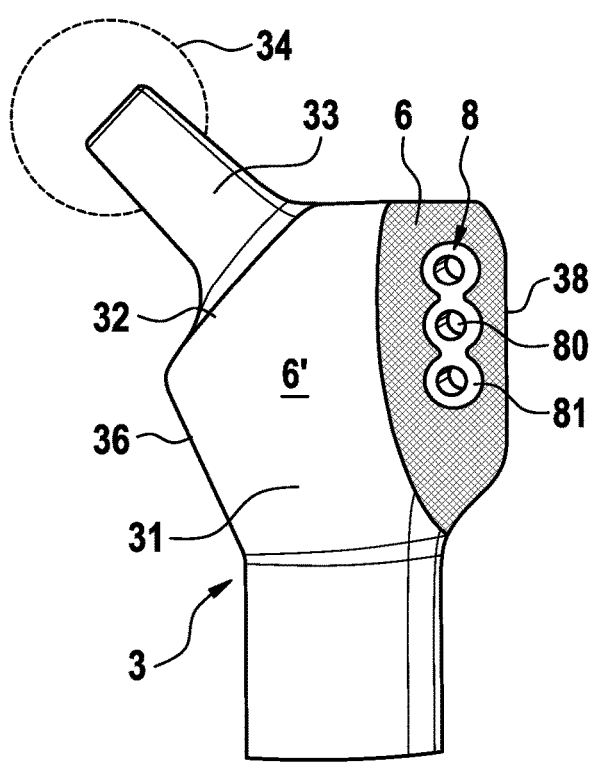
FIG. 3a, b are a frontal and a perspective view of the end piece according to the embodiment.

For a more detailed explanation of the end piece 3 and its porous surface formation 6, reference is now made to FIGS. 3a and b. It can be seen on the lateral side 38 in the upper region that the surface of the supporting body 31 is provided with the porous surface formation 6 there. In this case, the porous surface formation 6 also extends from the lateral side 38 in both an anterior and posterior direction. As such, the porous surface formation 6 also extends in the manner of a half shell over the transition to the anterior side 35 and to the posterior side 37. In relation to a central axis 30 of the end piece 3, the porous formation 6 thus extends over a circumferential angle α of approximately 160°. The exact value is not critical, but it is important that the porous formation 6 does not extend completely around, i.e., the angle α is significantly less than 360°, preferably at most 200°. In the remaining angular range, the surface 6' is designed differently, specifically closed and smooth in the illustrated embodiment.

The porous formation 6 is located approximately in the upper half of the supporting body 31 of the end piece 3. The porous formation 6 forms a defined starting point for soft tissue, specifically for the adhesion of the gluteus medius (not shown). By virtue of the porous formation 6, the muscle can attach precisely on the surface marked by the porous formation 6, and not in other regions. In this way, a precisely defined connection of the muscle to the modular endoprosthesis is achieved. This effectively prevents attachment in undesired regions.

Figure 4:
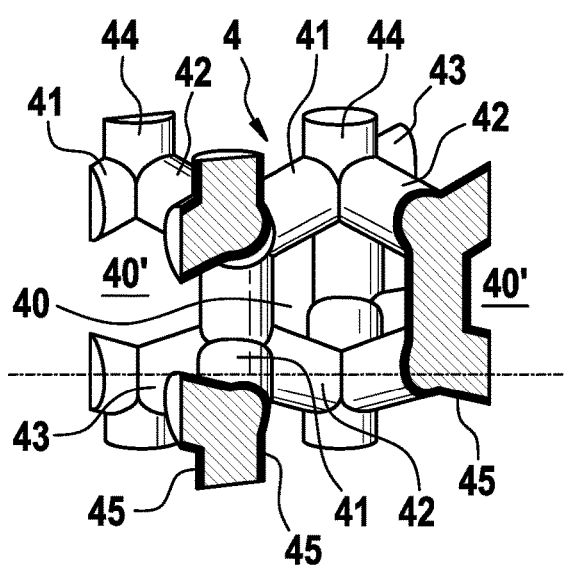
FIG. 4 is a schematic illustration of neighboring unit cells of a porous formation.

An exemplary structure of the porous formation 6 is shown schematically in FIG. 4. In this embodiment, the porous formation 6 is designed as an open-cell porous lattice structure. It is formed by a structure produced by means of an additive process (3D printing), for example EBM, and comprises a plurality of regularly arranged unit cells 4. In the embodiment shown, these are formed as a result of the unit cells 4 each having an interior space 40 and a plurality of bars 41, 42, 43, 44 connected to each other. This creates an open-cell structure which, on the one hand, ensures good penetration as a result of numerous interconnected cavities 40 and, on the other hand, as a result of numerous undercuts, ensures a solid and robust attachment, which is particularly advantageous for the connection of force-transmitting muscle tissue. Furthermore, the porous lattice structure 6 can be provided with a coating 45 which promotes growth. This may be arranged in individual unit cells 4, specifically the various bars 41, 42, 43, 44, and the depth of the open-cell porous formation 6. This further promotes ingrowth behavior, and thus makes it possible for the patient to be remobilized quickly and reliably.

As can also be seen in FIGS. 3a) and b), the porous formation 6 also preferably extends partially onto the upper side of the supporting body 31—in the lateral region of the upper side. A lower region of the supporting body 31, preferably the lower third, in which the supporting body 31 tapers in width, remains preferably completely free of the porous formation 6.

Figure 3B:
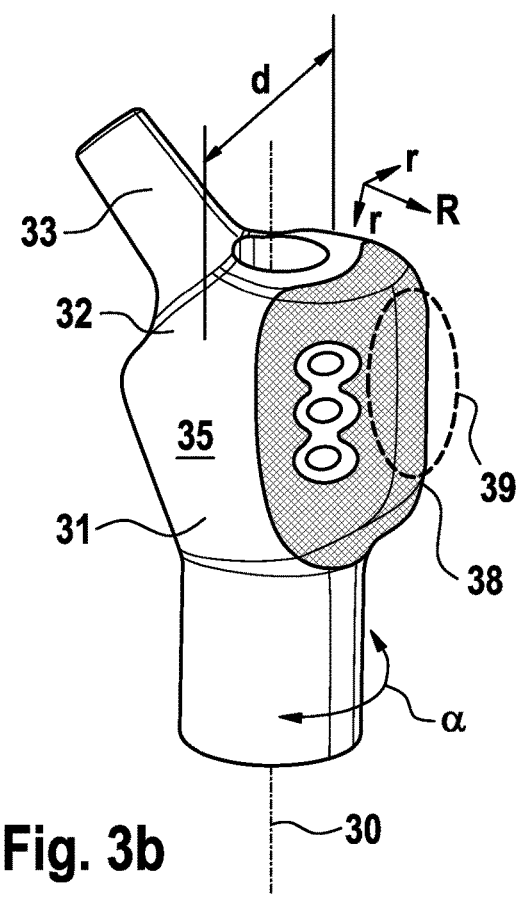

To further improve the ingrowth behavior, a flattening 39 is preferably provided on the lateral side 38 (see the area highlighted by the bold dashed lines in FIG. 3b). This creates a flatter structure there, which offers particularly favorable conditions for the muscle tissue to attach over a wide area. In this case, "flat" is understood to mean no or a slight curvature, the radius of curvature R of which is at least the distance d from the anterior to the posterior side of the supporting body 31, preferably twice said distance. In contrast, in the region of the transition from the lateral flattening 39 to the frontal or to the posterior side, it is more rounded and has a radius of curvature r that is at most half the distance d or less, preferably less than a quarter of the distance d.

Furthermore, one or more passage holes 8 can be arranged in the lateral region of the supporting body 31, extending transversely to the central axis 30 and opening into the region of the porous formation 6. In this case, their respective openings 80 are surrounded by a border 81 which surrounds each opening 80 like a wall. In this region, the surface is closed, i.e., not porous.

Figure 5:
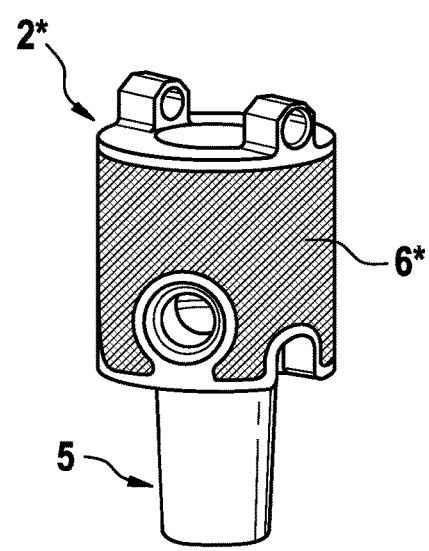
FIG. 5 is a perspective view of an exchangeable intermediate piece.

A further expedient supplementary part for the modular endoprosthesis is shown in FIG. 5. It shows an exchangeable intermediate piece 2*. It is designed substantially like the intermediate piece 2 shown in FIGS. 1 and 2, and likewise has a conical plug-in connection 5. In contrast to the intermediate piece 2, however, the exchangeable intermediate piece 2* is also provided with a porous formation 6 on its surface. The latter is constructed in a manner corresponding to the porous formation 6, but covers the lateral surface of the exchangeable piece 2* completely around. The result is an exchangeable piece for the modular endoprosthesis that can be used as required where the medical indication requires favorable conditions for the adhesion of soft tissue. This expands the field of application of the modular endoprosthesis.

The invention claimed is:

1. A modular endoprosthesis for at least partial replacement of a long bone, comprising as module components:
    a stem for insertion into a bone cavity of the long bone,
    an end piece comprising a supporting body with an anterior side, a posterior side, a medial side and a lateral side, and a neck part arranged on the medial side having a receptacle for a prosthetic joint component, wherein a lower region of the end piece extends completely around a circumference of the end piece, wherein the lower region is tapered, and
    at least one cylindrical intermediate piece, wherein the stem is sized and configured to couple and detach from the at least one intermediate piece at one end thereof, and wherein the end piece is sized and configured to connect and detach from the at least one intermediate piece at an opposite end thereof,
    characterized in that
    the end piece has at least two differently designed surface formations on its supporting body: a closed, non-porous surface on the medial side, and a porous formation on the lateral side, wherein the porous formation ends in a region of a transition to the taper,
    wherein the medial side of the end piece and the tapered lower region of the end piece are devoid of the porous formation,
    wherein the porous formation is designed as an open-cell porous lattice structure that extends from the lateral side to the anterior side and to the posterior side.

2. The modular endoprosthesis of claim 1, wherein the open-cell lattice structure comprises unit cells, wherein the unit cells are an assembled structure and each consist of an interior space and a plurality of interconnected bars surrounding the interior space.

3. The modular endoprosthesis of claim 1, wherein the porous formation of the surface is designed as a unit with the supporting body.

4. The modular endoprosthesis of claim 1, wherein the porous formation is provided with a coating which promotes growth.

5. The modular endoprosthesis of claim 4, wherein the coating comprises calcium phosphate.

6. The modular endoprosthesis of claim 4, wherein the coating comprises tantalum.

7. The modular endoprosthesis of claim 1, wherein the porous formation comprises a circumferential angle of about 120° to about 210° relative to a central axis of the end piece.

8. The modular endoprosthesis of claim 1, wherein a transition between the lateral side and one or both of the anterior side and the posterior side comprises a rounding with a lateral flattening.

9. The modular endoprosthesis of claim 8, wherein the rounding has a radius of curvature (r) which is at most a quarter of a distance (d) from the anterior side to the posterior side of the supporting body.

10. The modular endoprosthesis of claim 8, wherein the lateral flattening has a minimum radius of curvature (R) of twice a distance (d) from the anterior side to the posterior side of the supporting body.

11. The modular endoprosthesis of claim 8, wherein lateral flattening is configured as a contact and growth surface.

12. The modular endoprosthesis of claim 1, wherein the porous formation further extends to an upper side of the supporting body, in the lateral side.

13. The modular endoprosthesis of claim 1, further comprising a one or more passage holes in the lateral side, wherein the passage holes extend from the anterior side to the posterior side of the supporting body.

14. The modular endoprosthesis of claim 13, wherein the one or more passage holes open into a region having the porous formation, and each of their openings is provided with a non-porous border.

15. The modular endoprosthesis of claim 14, wherein the porous formation has pores with a width in the range between 0.4 and 2 mm.

16. The modular endoprosthesis of claim 13, wherein the one or more passage holes extend transversely to a central axis of the end piece.

17. The modular endoprosthesis of claim 1, wherein the module components can be connected by means of matching connections.

18. The modular endoprosthesis of claim 1, wherein the lower region of the end piece comprises a lower third of the end piece.

* * * * *